United States Patent
Windhorst et al.

[11] Patent Number: 6,082,666
[45] Date of Patent: Jul. 4, 2000

[54] SYSTEM FOR ACCURATELY DETERMINING MISSILE VERTICAL VELOCITY AND ALTITUDE

[75] Inventors: Robert D. Windhorst, Oro Valley; Stephen V. Sosinski, Tucson, both of Ariz.

[73] Assignee: Raytheon Company, Lexington, Mass.

[21] Appl. No.: 08/984,238

[22] Filed: Dec. 3, 1997

[51] Int. Cl.[7] .................................................... F41G 7/00
[52] U.S. Cl. ............................................................ 244/3.15
[58] Field of Search .................................. 244/3.15, 3.16, 244/3.19, 3.2; 342/62, 120, 161, 162, 115

[56] References Cited

U.S. PATENT DOCUMENTS

| | | | |
|---|---|---|---|
| 3,702,477 | 11/1972 | Brown | 342/451 |
| 4,325,066 | 4/1982 | Grettenberg | 342/61 |
| 4,589,610 | 5/1986 | Schmidt | 244/3.19 |
| 4,692,765 | 9/1987 | Politis et al. | 342/106 |
| 4,700,307 | 10/1987 | Mons et al. | 342/64 |
| 4,806,940 | 2/1989 | Harral et al. | 342/451 |
| 4,847,673 | 7/1989 | DeBell | 342/25 |
| 5,272,639 | 12/1993 | McGuffin | 342/63 |
| 5,345,241 | 9/1994 | Huddle | 342/63 |
| 5,485,384 | 1/1996 | Falconnet | 342/25 |
| 5,543,804 | 8/1996 | Buchler et al. | 342/357 |
| 5,660,355 | 8/1997 | Waymeyer | 244/3.15 |
| 5,696,347 | 12/1997 | Sebeny, Jr. et al. | 102/214 |
| 5,755,400 | 5/1998 | Kalm, III | 244/3.17 |

Primary Examiner—Charles T. Jordan
Assistant Examiner—Denise J Buchley
Attorney, Agent, or Firm—Andrew J. Rudd; Glenn H. Lenzen, Jr.

[57] ABSTRACT

A system (30) for determining a missile kinematic property. The inventive system includes a radar system (36) for obtaining radar range measurements (34). An inertial reference unit (40) tracks changes in missile acceleration without the use of the radar range measurements and provides a signal (38, 42) in response thereto. An altitude Kalman filter (32) and a subtractor circuit (48) are used to combine the signal (38, 42) and the radar range measurements (34) to provide an accurate estimate (50) of the property. In a specific embodiment, the kinematic property includes missile vertical velocity and missile altitude. A radar system (36) supplies radar range information (34) to the Kalman filter (32). A loop (52) from the Kalman filter (32) to the radar system (36) facilitates estimating the radar range measurements (34) when invalid radar range measurements are provided by the radar system (36). The Kalman filter (34) is a two state filter, one state corresponding to missile altitude, and the other state corresponding to missile vertical velocity bias error in the inertial reference unit's (40) velocity measurements (42). In the illustrative embodiment, the Kalman filter (32) combines radar pseudo-measurement estimates of missile altitude with estimates (38) of missile altitude obtained from the inertial reference unit (40) and provides an output signal (46) representative of an accurate missile altitude estimate in response thereto. The Kalman filter (32) includes a velocity bias output (44) which provides an estimate of the error in a velocity measurement (42) obtained from inertial reference unit (40) to the subtractor circuit (48). The subtractor circuit (48) subtracts the estimate (44) of the bias error from the velocity measurement (42) and provides the missile velocity estimate (50) in response thereto.

6 Claims, 2 Drawing Sheets

6,082,666

SYSTEM FOR ACCURATELY DETERMINING MISSILE VERTICAL VELOCITY AND ALTITUDE

BACKGROUND OF THE INVENTION

1. Field of Invention

This invention relates to missile systems. Specifically, the present invention relates to systems for accurately determining the velocity and vertical position of a missile in flight.

2. Description of the Related Art

Missiles are designed for a variety of demanding applications ranging from explosives delivery to satellite launching applications. Such applications often require accurate missile velocity, acceleration, and position information to make in-flight steering and targeting adjustments. Such accurate kinematic information is particularly important in military applications involving low flying missiles. Slight errors in missile vertical velocity and altitude measurements will hamper the use of this information for missile functions. This results in decreased missile accuracy and lethality.

Typically, missiles used in military applications include an on-board inertial reference unit (IRU) for taking missile kinematic measurements. The IRU has a sensor that detects changes in missile inertial position accelerometers in the IRU and measure missile accelerations which are then used to compute missile velocity, and position. The current missile position and velocity are calculated with reference to an initial position and velocity, respectively. Initialization error and IRU measurement error accumulate over the flight of a missile, severely degrading missile vertical velocity and position estimates.

A system that utilizes missile radar range, i.e., distance measurements rather than IRU measurements is often used to correct error associated with missile vertical velocity estimates. In this system, radar range measurements are differentiated to obtain estimates of missile velocity. Significant error often results, however, due to radar sensor noise. Other similar systems attempt to reduce the effects of sensor noise by averaging radar range measurements before differentiation. These systems however, fail to account for missile vertical acceleration due to missile velocity and flight path angle changes. Resulting vertical velocity measurement errors are still unacceptable for some applications.

Hence, a need exists in the art for a system that accurately measures missile vertical velocity and position, that is immune to IRU initialization error, and that takes into account changes in vertical acceleration of the missile.

SUMMARY OF THE INVENTION

The need in the art is addressed by the system for determining a missile kinematic property of the present invention. In the illustrative embodiment, the inventive system is adapted for use with missiles used in military applications and includes a radar system for obtaining radar range measurements. An inertial reference unit tracks missile acceleration without the use of the radar range measurements and provides a signal in response thereto. An altitude Kalman filter and a subtractor circuit are used to combine the signal and the radar range measurements to provide an accurate estimate of the property.

In a specific embodiment, the kinematic property includes missile vertical velocity and missile altitude. An on-board radar system supplies sequential radar range information to the Kalman filter. A loop from the Kalman filter to the radar system facilitates surface re-acquisition when radar range measurements are lost for any reason, such as fades.

The Kalman filter is a two state filter, each state characterized by one of the following state equations:

$$h_{msf}(t_{k+1}) = h_{msf}(t_k) + V_{msf}(t_k)(t_{k+1} - t_k),$$

where $h_{msf}(t_{k+1})$ is a pseudo measurement estimate of the current altitude linearly extrapolated from a previous pseudo measurement altitude estimate $h_{msf}(t_k)$ using an estimate of inertial z-channel, i.e., vertical missile velocity $V_{msf}(t_k)$; and $$V_{bias}(t_k) = V_{IRU}(t_k) - V_{msf}(t_k)$$

where $V_{bias}(t_k)$ is the bias error in an IRU's estimate of vertical velocity, $V_{IRU}(t_k)$ is the IRU's estimate of vertical velocity, and $V_{msf}(t_k)$ is a vertical velocity estimate obtained by differentiating average range measurements.

The Kalman filter operates in accordance with the following Kalman filter covariance equations:

$$P_{11}(t_{k+1}, t_k) = P_{11}(t_k, t_k) - 2*\Delta T*P_{12}(t_k, t_k) + \Delta T^2 * P_{22}(t_k, t_k)$$

$$P_{11}(t_{k+1}, t_k) = P_{12}(t_k, t_k) + \Delta T^2 * P_{22}(t_k, t_k)$$

$$P_{11}(t_{k+1}, t_k) = P_{22}(t_k, t_k) + Q_{22},$$

where $P_{11}$ represents the error covariance of an estimate of missile altitude, $P_{22}$ represents the error covariance of an estimate of vertical velocity bias, $P_{12}$ represents an error cross-covariance between an estimates of altitude and vertical velocity bias, $Q_{22}$ represents state process noise, and the notation $(t_j, t_k)$ denotes the best time estimate at a time $t_j$ given all measurements through and including time $t_k$.

In the illustrative embodiment, the Kalman filter combines pseudo-measurement estimates of missile altitude with estimates of missile altitude obtained from the inertial reference unit and provides an output signal representative of an accurate missile altitude estimate in response thereto. The pseudo-measurement estimates are obtained in accordance with the following pseudo-measurement equation:

$$h_{missile} = (R_{slant}) * \sin(\theta_{beam} - \theta_{pitch}),$$

where $R_{slant}$ corresponds to a slant range measurement, $\theta_{beam}$ corresponds to a radar beam angle, $\theta_{pitch}$ corresponds to a missile pitch angle, and $h_{missile}$, corresponds to the altitude of said missile.

The Kalman filter includes a velocity bias output which provides an estimate of the error in a velocity measurement obtained from inertial reference unit to the subtractor circuit. The subtractor circuit subtracts the estimate of the bias error from the velocity measurement and provides the missile velocity estimate in response thereto.

By uniquely combining information from an on-board inertial reference unit and radar system, estimates of velocity bias error in the inertial reference measurements are obtained. Knowledge of this error is used to correct the corresponding measurements. Hence, the present invention utilizes the inertial reference unit's ability to accurately follow short term changes in missile altitude and velocity with the radar systems invulnerability to initialization error, to produce accurate missile vertical velocity and altitude measurements that have minimal inertial reference unit initialization error, and remain accurate during and after changes in missile vertical acceleration.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
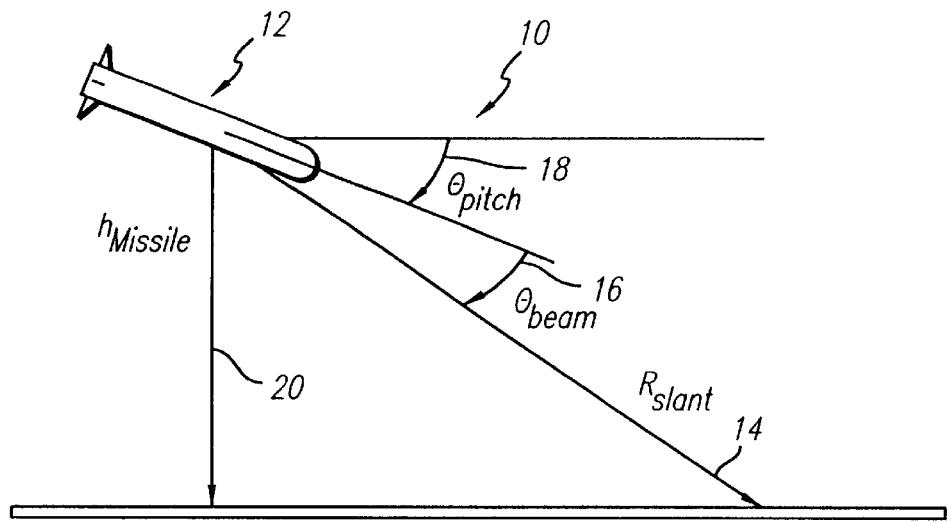
FIG. 1 is a diagram of a missile illustrating key measurements used by the system of the present invention.

FIG. 1 is a diagram 10 of a missile 12 illustrating key measurements used by the system of the present invention. The measurements include a slant range measurement ($R_{slant}$) 14, radar beam angle ($\theta_{beam}$) 16, missile pitch angle ($\theta_{pitch}$) 18, and missile altitude ($h_{missile}$) 20. The rate of change of the missile of altitude 20 is typically estimated by an inertial reference unit (IRU) (see FIG. 2) on board the missile 12.

The inertial reference, unit senses changes in missile inertia, computes the acceleration required to produce the sensed change in inertia, and integrates the acceleration to obtain the IRU velocity estimate. The IRU estimates the current altitude 20 and velocity of the missile by extrapolating from initialization parameters such as the initial position and initial velocity. Over several changes in missile velocity, error accumulates in the IRU position information.

The system (see FIG. 2) of the present invention utilizes pseudo measurements to keep this error in check. The pseudo measurements of altitude are computed as a function of the slant range measurement 14, the radar beam angle 16, and the missile pitch angle 18:

$$h_{missile} = (R_{slant}) * \sin(\theta_{beam} - \theta_{pitch}), \quad (1)$$

where $R_{slant}$ corresponds to the slant range measurement 14, $\theta_{beam}$ corresponds to the radar beam angle 16, $\theta_{pitch}$ corresponds to the missile pitch angle 18, and $h_{missile}$ is the missile altitude 20. $\theta_{pitch}$ is negative so that $\theta_{beam} - \theta_{pitch}$ is positive.

The system of the present invention utilizes the ability of the IRU to accurately follow short term changes in missile altitude. More accurate radar range measurements, i.e., the pseudo altitude measurements are then smoothed over a given time interval with knowledge of the short term changes in missile altitude provided by the IRU. The smoothed altitude measurements are subsequently differentiated and used to remove bias error in the IRU vertically velocity measurements.

Figure 2:
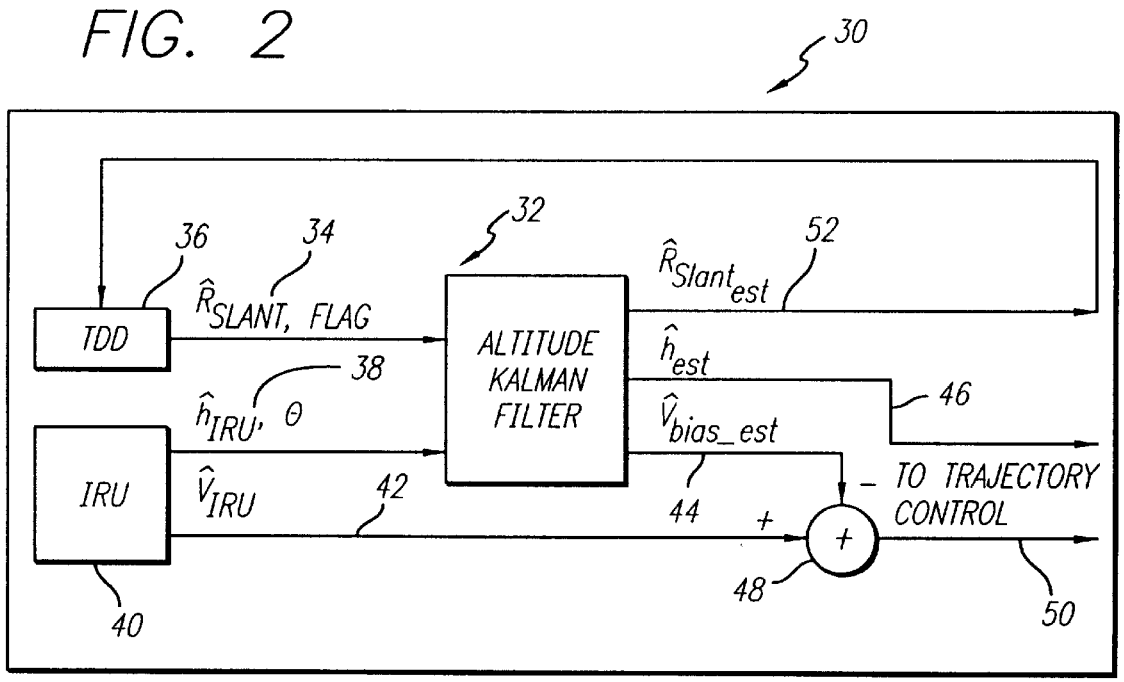
FIG. 2 is a block diagram of a system for accurately estimating missile vertical velocity and altitude constructed in accordance with the teachings of the present invention.

FIG. 2 is a block diagram of a system 30 for accurately estimating missile vertical velocity and altitude constructed in accordance with the teachings of the present invention. The system 30 includes an altitude Kalman filter 32 that receives slant range measurement information 34 from a radar system 36 which may be implemented with a conventional target detection device (TDD). The Kalman filter 32 also receives missile position and orientation information 38 and IRU velocity information 42 from an IRU 40. The Kalman filter 32 operates on the slant range information 34 and the position and orientation information 38 determine an estimate 44 of the error, i.e., bias ($V_{bias}$) that has accumulated in the IRU estimate of vertical velocity ($V_{IRU}$) 42. The Kalman filter 32 also combines the slant range information 34 with the IRU position information to provide a more accurate estimate of altitude 46. The Kalman filter 32 smoothes and then differentiates radar range measurements 34 over a given time interval to determine and remove the bias error in the inertial reference unit's measurements 38.

The IRU velocity estimate bias 44 is output from the Kalman filter 32 to a subtractor circuit 48 which deducts the IRU velocity bias 44 from the IRU velocity estimate 42 to provide an accurate estimate 50 of vertical velocity.

The slant range information 34 includes a validity flag (not shown) that notifies the Kalman filter 32 when a radar slant range measurement is invalid or has accumulated too much error. In this case, the Kalman filter 32 receives and detects the invalid flag from the TDD 36 and subsequently fills in the invalid slant range measurement with a previous slant range measurement. The previous slant range measurement is output from the Kalman filter at an output 52 and input to the TDD 36. This optimizes the ability of the Kalman filter 32 to compute the IRU vertical velocity bias 44 and the missile altitude 46 when radar slant range measurements are not available. The Kalman filter has the ability to extrapolate altitude estimates 46 during fade, i.e., when no slant range measurements are available.

Kalman filters are well known in the art and may be implemented in accordance with the teachings of the present invention via the selection of filter state equations (see Equations 2 and 3) and covariance equations (see Equations 6 through 8).

The two states of the Kalman filter 32 correspond to:
1. Missile altitude above ground; and
2. Bias error in the IRU altitude rate, i.e., vertical velocity measurement.

The state equation corresponding to the missile altitude above ground at a given time $t_{k+1}$ is a function of the missile altitude and velocity at the previous time $t_k$ at which altitude and velocity measurements were taken:

$$h_{msf}(t_{k+1}) = h_{msf}(t_k) + V_{msf}(t_k)(t_{k+1} - t_k), \quad (2)$$

where $h_{msf}(t_{k+1})$ is the pseudo measurement estimate of the current altitude linearly extrapolated from the prior pseudo measurement altitude estimate $h_{msf}(t_k)$ using an estimate of inertial z-channel, i.e., vertical missile velocity $V_{msf}(t_k)$. The vertical velocity estimate $V_{msf}(t_k)$ was previously obtained by differentiating an average measured altitude over a predetermined time interval. This extrapolation occurs when no range data is available as signaled by the flag in the information 34.

The state equation corresponding to the bias error in an IRU vertical velocity measurement $V_{IRU}$ is obtained via the following equation:

$$V_{bias}(t_k) = V_{IRU}(t_k) - V_{msf}(t_k) \quad (3)$$

where $V_{bias}(t_k)$ is the bias error in the IRU's 40 estimate of vertical velocity, $V_{IRU}(t_k)$ is the IRU's 40 estimate of vertical velocity, and $V_{msf}(t_k)$ is the vertical velocity estimate obtained by differentiating average range measurements.

The Kalman filter 32 combines equations (1) and (3) to compute a more accurate altitude estimate as illustrated in the following state equation:

$$h_{KF}(t_{k+1}) = h_{KF}(t_k) + V_{IRU}(t_k)(t_{k+1} - t_k) - V_{bias}(t_k)(t_{k+1} - t_k), \quad (4)$$

where $h_{KF}(t_{k+1})$ is the current altitude estimate provided by the Kalman filter 32, $h_{KF}(t_k)$ is the previous altitude estimate, $V_{IRU}(t_k)$ is the previous IRU estimate of vertical velocity, $(t_{k+1}-t_k)$ is the time elapsed between the current time $t_{k+1}$ and the previous time $t_k$, and $V_{bias}(t_k)$ corresponds to the IRU vertical velocity bias. The above equation may be written as:

$$\Delta h_{KF} = \Delta h_{IRU} - \Delta h_{bias}, \tag{5}$$

where $\Delta h_{KF} = h_{KF}(t_{k+1}) = h_{KF}(t_k)$, $\Delta h_{IRU} = V_{IRU}(t_k)(t_{k+1}-t_k)$, and $\Delta h_{bias} = V_{bias}(t_k)(t_{k+1}-t_k)$.

Hence, the change in altitude $\Delta h^{KF}$ over a time interval $(t_{k-1}-t_k)$ as determined by the Kalman filter 32 is the change in altitude $\Delta h_{IRU}$ as measured by the IRU 40 adjusted for bias error $\Delta h_{bias}$ inherent in IRU measurements.

Those skilled in the art will appreciate that the Kalman filter 32 of the present invention may be implemented with average velocity and average altitude measurements without departing from the scope of the present invention. For example, the IRU vertical velocity $V_{IRU}(t_k)$ may be replaced with the average velocity: $(\frac{1}{2})(V_{IRU}(t_{k+1})+V_{IRU}(t_k))$, and the change in altitude $\Delta h_{IRU}$ as measured by the IRU may be replaced with the average change in altitude: $(\frac{1}{2})(V_{IRU}(t_{k+1})+V_{IRU}(t_k))(t_{k+1}-t_k)$ without departing from the scope of the present invention.

Given the previous state equations (2), (3), and (4), the Kalman filter propagation covariance equations are:

$$P_{11}(t_{k+1}, t_k) = P_{11}(t_k, t_k) - 2*\Delta T * P_{12}(t_k, t_k) + \Delta T^2 * P_{22}(t_k, t_k) \tag{6}$$

$$P_{11}(t_{k+1}, t_k) = P_{12}(t_k, t_k) + \Delta T^2 * P_{22}(t_k, t_k) \tag{7}$$

$$P_{11}(t_{k+1}, t_k) = P_{22}(t_k, t_k) + Q_{22}, \tag{8}$$

where $P_{11}$ represents the error covariance of the Kalman filter's 32 estimate of missile altitude, $P_{22}$ represents the error covariance of the filter's 32 estimate of vertical velocity bias, $P_{12}$ represents the error cross-covariance between the filter's 32 estimates of altitude and vertical velocity bias, and $Q_{22}$ represents state process noise. Quantities in braces $(t_j, t_k)$ represent the best time estimate at a time $t_j$ given all measurements through and including time $t_k$. For example, $P_{11}(t_{k+1}, t_k)$ represents the missile altitude estimation error covariance at the time $t_{k+1}$ given all measurements through and including time $t_k$.

Before the Kalman filter 32 is employed, it is initialized. The Kalman filter 32 initialization involves initializing the filter states and the covariances. The filter states are initialized as follows:

1. The altitude state is set equal to the first measured altitude.
2. The IRU altitude rate bias is set to zero.

The error covariances are initialized as follows: $P_{11}$ is set equal to the computed variance corresponding to the first measured altitude. $P_{22}$ is set to an apriori value based upon the expected IRU altitude rate bias error. $P_{12}$ is set assuming an apriori value for the correlation coefficient between $P_{11}$ and $P_{22}$ using:

$$P_{12} = \rho_{12}(P_{11}*P_{22})^{(\frac{1}{2})} \tag{9}$$

where ρ12 is the correlation coefficient.

Figure 3:
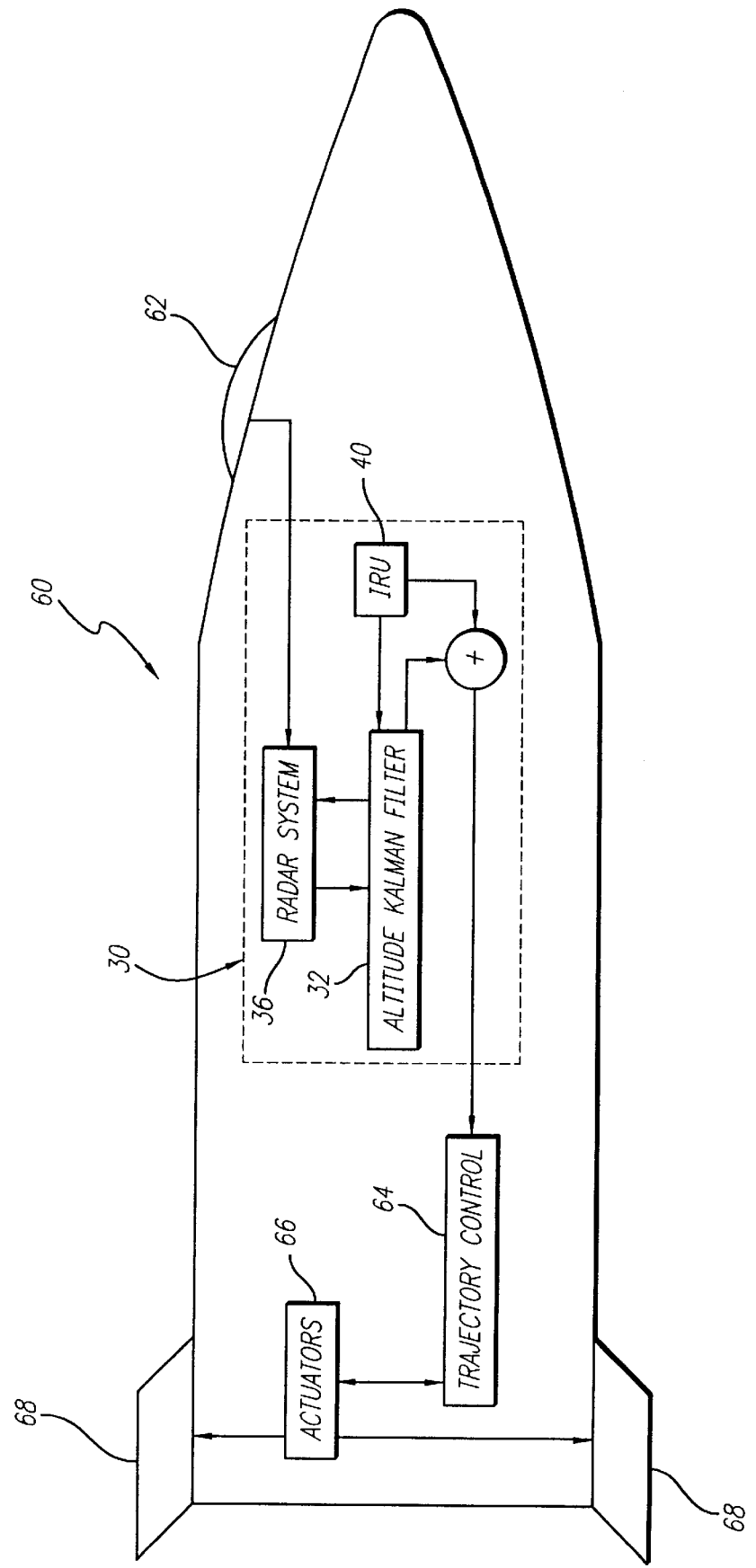
FIG. 3 is a diagram of a missile constructed in accordance with the teachings of the present invention incorporating the system of FIG. 2.

FIG. 3 is a diagram of an improved missile 60 incorporating the system 30 of FIG. 2. The radar system 36 receives radar range information via infrared and/or other sensors 62 mounted on the missile 60. Accurate missile altitude and velocity information is provided by the missile position and altitude determination system 30 to a trajectory control circuit 64. The trajectory control circuit 64 generates commands based on the altitude and velocity information and a desired trajectory that is stored in trajectory control memory or received via radio communications. The commands control actuators 66 that in turn control missile flippers 68 to steer the missile to the desired trajectory or to maintain the missile on the desired flight path.

A method for producing accurate missile vertical velocity estimates according to the teachings of the present invention includes the following steps:

1. Initializing the Kalman filter state equations (2, 3) and covariance equations (6, 7, 8).
2. Receiving radar slant range and angle information from the radar system into the Kalman filter 32.
3. Receiving the IRU altitude measurements into the Kalman filter 32.
4. Combining the radar slant range and angle information with the IRU altitude information to estimate a bias error in an IRU velocity measurement via the Kalman filter 32.
5. Compensating the IRU velocity measurement in accordance with the bias estimate.
6. Outputting the compensated estimate of IRU velocity.
7. Outputting an estimate of missile altitude based on radar slant range information, and the compensated estimate of IRU velocity.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A system for providing an accurate estimate of missile vertical velocity comprising:

first means for obtaining radar range measurements;

second means for tracking changes in missile acceleration without the use of radar range measurements and providing a signal in response thereto, said second means including an inertial reference unit (IRU); and third means for combining said signal and said radar range measurements to provide said accurate estimate of missile vertical velocity, third means for combining said signal and said radar range measurements to provide said accurate estimate of missile vertical velocity, said third means including a Kalman filter and said Kalman filter being a two state Kalman filter, each state corresponding to one of the following state equations:

$$h_{msi}(t_{k+1}) = h_{msi}(t_k) + V_{msi}(t_k)(t_{k+1}-t_k),$$

where $h_{msi}(t_{k+1})$ is a pseudo measurement estimate of the current altitude linearly extrapolated from a previous pseudo measurement altitude estimate $h_{msi}(t_k)$ using an estimate of vertical missile velocity $V_{msi}(t_k)$; and $$V_{bias}(t_k) = V_{IRU}(t_k) - V_{msi}(t_k)$$

where $V_{bias}(t_k)$ is the bias error in the IRU's estimate of vertical velocity, $V_{IRU}(t_k)$ is the IRU's estimate of vertical velocity, and $V_{msi}(t_k)$ is a vertical velocity estimate obtained by differentiating average range measurements.

2. The invention of claim 1 wherein said Kalman filter operates in accordance with the following Kalman filter covariance equations:

$$P_{11}(t_{k+1}, t_k) = P_{11}(t_k, t_k) - 2*\Delta T * P_{12}(t_k, t_k) + \Delta T^2 * P_{22}(t_k, t_k)$$

$$P_{11}(t_{k+1}, t_k) = P_{12}(t_k, t_k) + \Delta T^2 * P_{22}(t_k, t_k)$$

$$P_{11}(t_{k+1}, t_k) = P_{22}(t_k, t_k) + Q_{22},$$

where $P_{11}$ represents the error covariance of an estimate of missile altitude, $P_{22}$ represents the error covariance of an estimate of vertical velocity bias, $P_{12}$ represents an error cross-covariance between an estimates of altitude and vertical velocity bias, $Q_{22}$ represents state process noise, and the notation $(t_j, t_k)$ denotes the best time estimate at a time $t_j$ given all measurements through and including time $t_k$.

3. The invention of claim 1 wherein said Kalman filter is implemented to combine pseudo-measurement estimates of missile altitude with estimates of missile altitude obtained from said second means and to provide an output signal representative of an accurate missile altitude estimate in response thereto.

4. The invention of claim 3 wherein said pseudo-measurement estimates are obtained in accordance with the following pseudo-measurement equation:

$$h_{missile}=(R_{slant})*\sin(\theta_{beam}-\theta_{pitch}),$$

where $R_{slant}$ corresponds to a slant range measurement, $\theta_{beam}$ corresponds to a radar beam angle, $\theta_{pitch}$ corresponds to a missile pitch angle, and $h_{missile}$ corresponds to the altitude of said missile.

5. The invention of claim 1 wherein said Kalman filter includes a velocity bias output which provides an estimate of the error in a velocity measurement obtained from said second means to said third means.

6. The invention of claim 5 wherein said third means includes a subtractor circuit for subtracting said estimate of the error from said velocity measurement and providing said missile velocity estimate in response thereto.

* * * * *